United States Patent
Chien (12)

(10) Patent No.: US 6,336,731 B1
(45) Date of Patent: Jan. 8, 2002

(54) FIELD MULTI-USE TOOL STRUCTURE

(76) Inventor: Kuo-Huei Chien, P.O. Box 2103, Taichung (TW)

( * ) Notice: Subject to any disclaimer, the term of this patent is extended or adjusted under 35 U.S.C. 154(b) by 0 days.

(21) Appl. No.: 09/632,300

(22) Filed: Aug. 3, 2000

(51) Int. Cl.[7] .............................. B25B 23/18; B25G 3/26
(52) U.S. Cl. ........................ 362/120; 362/253; 81/491
(58) Field of Search ................. 362/109, 119, 362/120, 253; 81/491

(56) References Cited

U.S. PATENT DOCUMENTS

| | | | | |
|---|---|---|---|---|
| 1,144,210 A | * | 6/1915 | Kincaid | 362/119 |
| 2,174,126 A | * | 9/1939 | Glenn et al. | 362/120 |
| 4,409,866 A | * | 10/1983 | McBride | 81/491 |
| 4,669,186 A | * | 6/1987 | Liu | 362/120 |
| 5,611,615 A | * | 3/1997 | Jang | 362/119 |
| 5,655,308 A | * | 8/1997 | McDermott | 362/205 |
| 5,964,517 A | * | 10/1999 | Adams | 362/119 |
| 6,135,608 A | * | 10/2000 | Lin | 362/119 |

* cited by examiner

Primary Examiner—Alan Cariaso

(57) ABSTRACT

A field multi-use tool structure including Ad multiple tools. An illuminating unit is disposed in the grip. The front end of the grip has a tool connecting section formed with a central socket axially rearward extending from front end thereof. One side of the tool connecting section is formed with a front and a rear radial through holes communicating with the socket. A locating pin and an engaging pin are respectively passed through the front and rear through holes. The engaging pin has a large diameter section and a small diameter section. A spring is fitted around the small diameter section. One end of each of the tools is formed with a working section with different functions, while the other end of the tool is formed with a fitting section formed with a locating split for fitting with the locating pin and the small diameter section of the engaging pin. The locating split is formed with an enlarged engaging bore corresponding to the engaging pin for the large diameter section thereof to fit into the engaging bore. The locating pin and engaging pin of the tool connecting section of the grip can respectively extend into the locating split and engaging bore of the fitting section of the tool so as to fix the tool with the grip. Therefore, different kinds of tools can be easily connected with one single grip to facilitate carriage of the tools. In addition, the illuminating unit in the grip provides necessary illumination for working in dark places.

2 Claims, 4 Drawing Sheets

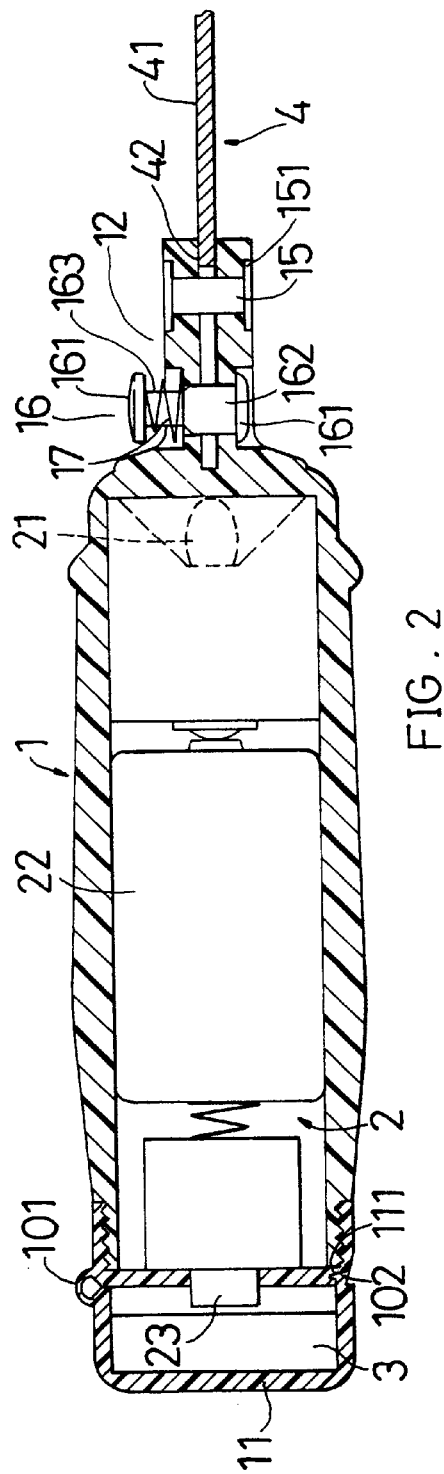
FIG. 2
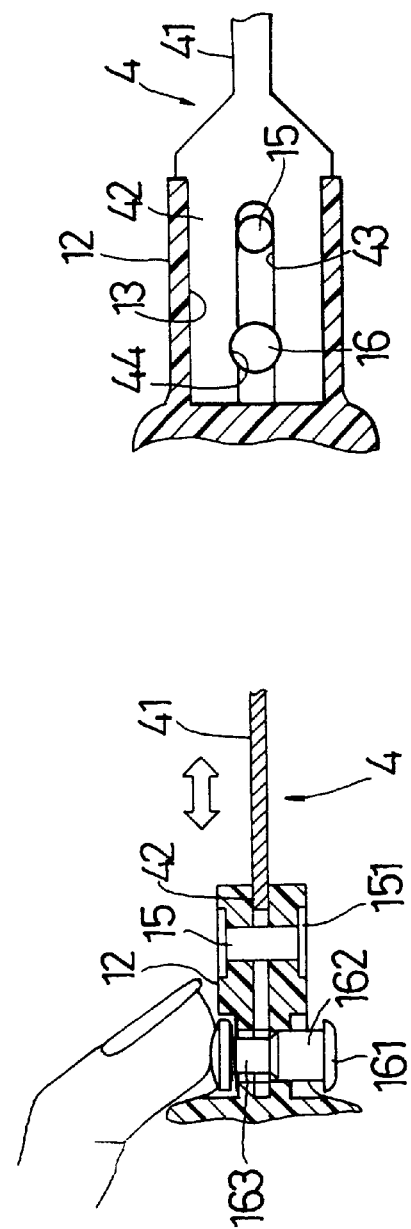
FIG. 3
FIG. 4

US 6,336,731 B1

FIELD MULTI-USE TOOL STRUCTURE

BACKGROUND OF THE INVENTION

The present invention relates to a field multi-use tool structure in which different kinds of tools can be easily replaceably connected with one single grip to facilitate carriage of the tools. The tool connecting section of the grip has a locating pin for more firmly connecting the tool with the grip. In addition, an illuminating unit is disposed in the grip to provide necessary illumination for working in dark places.

There are various kinds of conventional field tools. A user must carries multiple such tools at the same time to satisfy the requirements for field activities. A general field tool often has a grip section with considerably large volume. When carrying various kinds of tools, a great room will be occupied. In order to solve this problem, multi-use tools such as Swiss knives have been developed. However, the multi-use tool only includes small-size tools such as mini-knife, mini-screwdriver, mini-scissors, etc., while it is impossible to install larger tools thereon, such as a saw, survival knife, fork, pan, shovel, etc. Therefore, a user still must additionally carries the saw, survival knife, fork, pan, shovel, etc. which will occupy much room.

Furthermore, a general multi-use tool is not equipped with any illuminating device so that when camping in a field or in a dim place, it is hard to use such tool to work. Under such circumstance, the user must operate the tool with one hand and hold a work piece with the other hand and further hold an additional illuminating lamp in the mouth or hang the lamp at a certain position for illuminating the working site. This is inconvenient for the user.

SUMMARY OF THE INVENTION

It is therefore a primary object of the present invention to provide a field multi-use tool structure in which a locating pin and an engaging pin disposed on the tool connecting section of the grip can respectively extend into the locating split and engaging bore of the fitting section of the tool so as to fix the tool with the grip. Therefore, different kinds of tools can be easily replaceably connected with one single grip to facilitate carriage of the tools.

It is a further object of the present invention to provide the above field multi-use tool structure in which an illuminating unit is disposed in the grip provides necessary illumination for working in dark places so that a user no more needs to operate the tool with single hand.

It is a further object of the present invention to provide the above field multi-use tool structure in which after the tool is connected with the grip, the fitting section of the tool will not collide the inner wall of the tool connecting section of the grip when applying a force onto the tool so that the using life of the tool can be prolonged.

The present invention can be best understood through the following description and accompanying drawings wherein:

BRIEF DESCRIPTION OF THE DRAWINGS

FIG. 2 is a sectional assembled view of the present invention;

FIG. 3 is a sectional assembled view of the present invention seen in another direction;

FIG. 4 is a sectional view of the present invention, showing that the engaging pin is pressed down;

DETAILED DESCRIPTION OF THE PREFERRED EMBODIMENT

Figure 1:
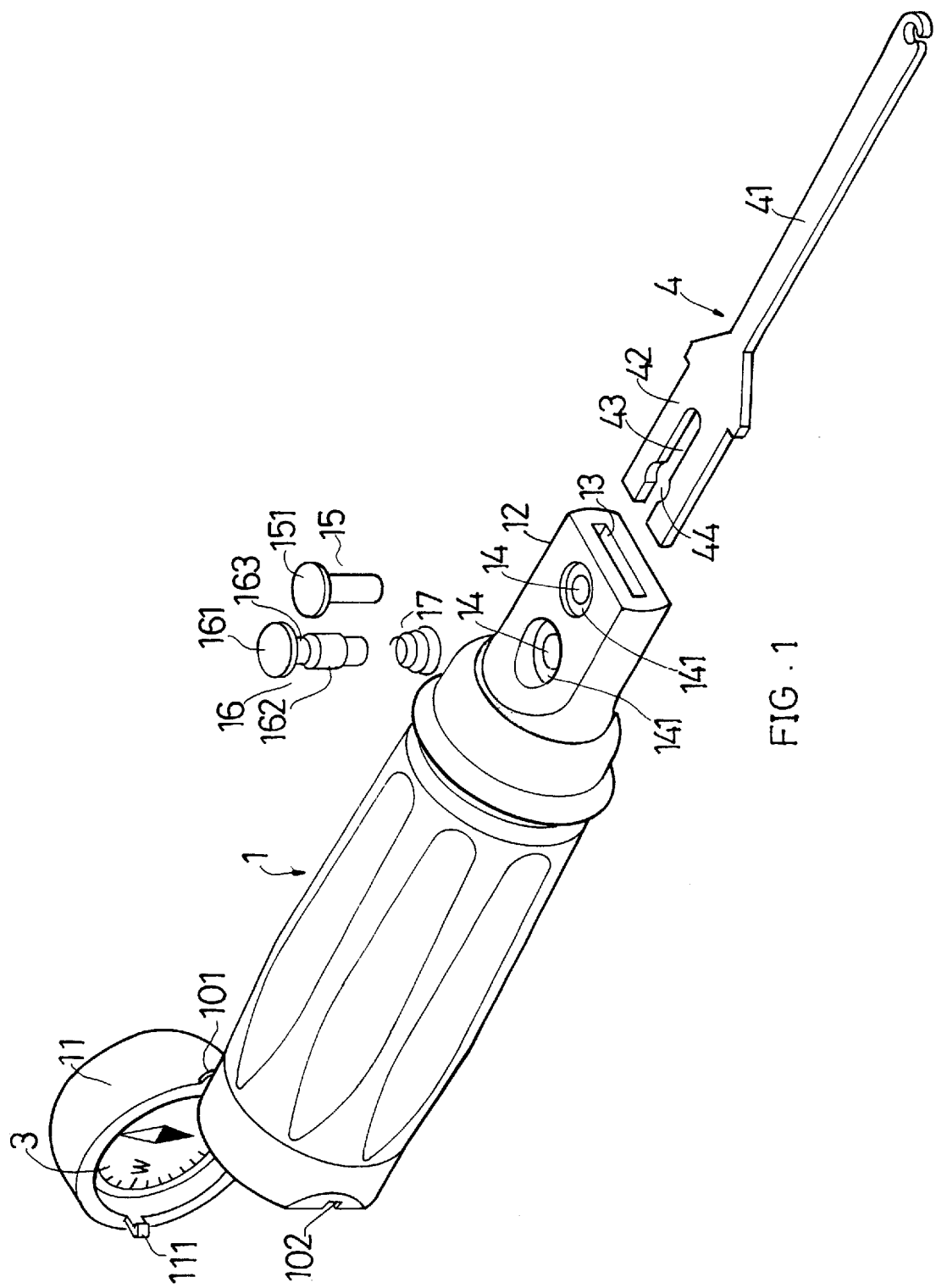
FIG. 1 is a perspective exploded view of the present invention.
Figure 5:
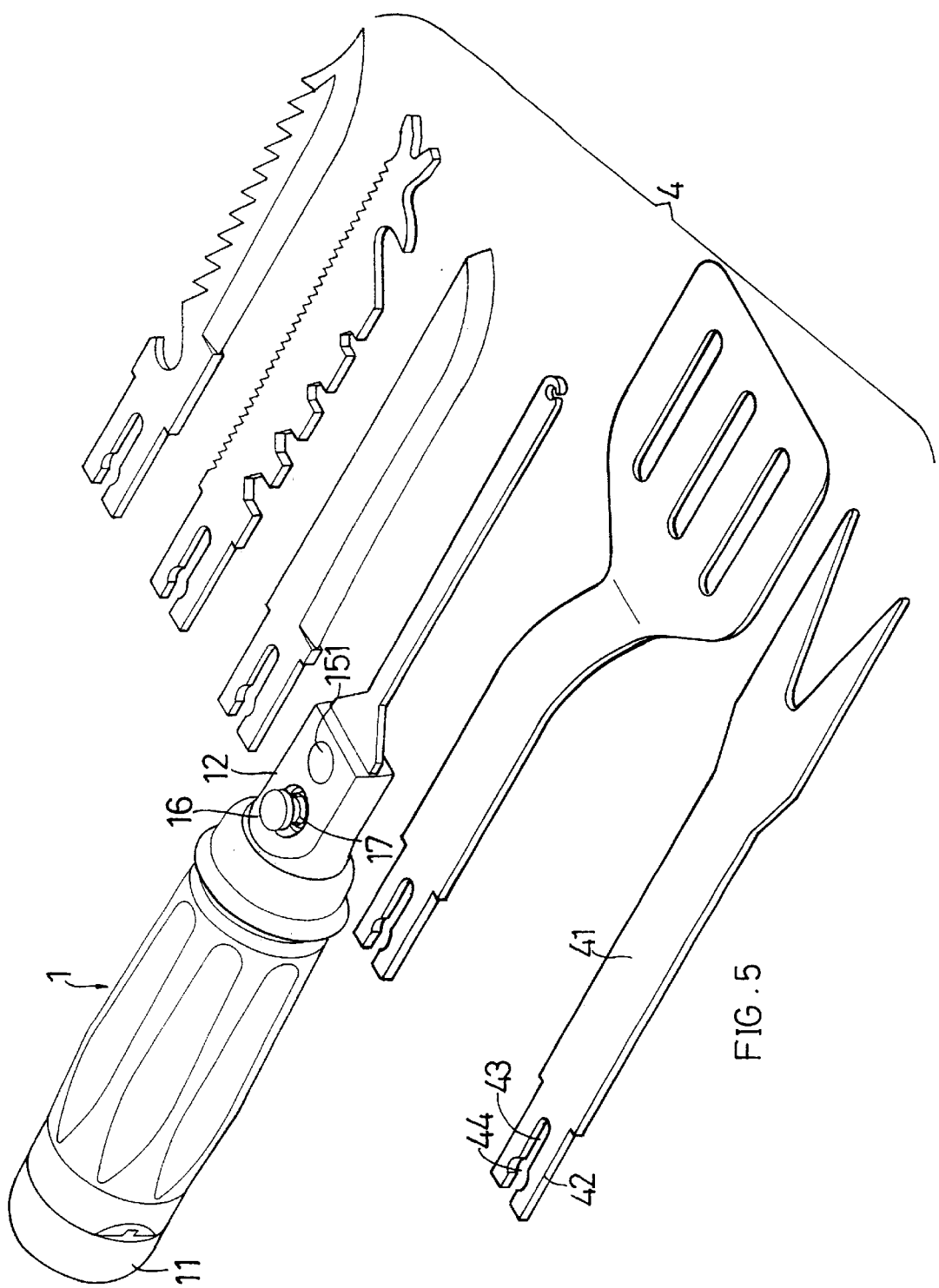
FIG. 5 shows a kit of tools of the present invention.

Please refer to FIGS. 1 and 5. According to a preferred embodiment, the field multi-use tool structure of the present invention includes a grip made of transparent material and multiple tools 4 with different functions. An illuminating unit 2 is disposed in the grip 1, including a light emitting member 21, a set of cells 22 and a switch 23 positioned at rear end face of the grip 1. A connecting section 101 is disposed on one side of the rear end of the grip 1 for pivotally connecting with a rear cap 11. A compass 3 is disposed in the rear cap 11. A hook section 111 is formed on one side of the rear cap 11 opposite to the pivot section. The grip 1 is formed with a dent 102 corresponding to the hook section 111 of the rear cap 11 for latching with the hook section 111 when closing the rear cap 11. The front end of the grip 1 is disposed with a tool connecting section 12 for connecting with a tool 4. The tool connecting section 12 is formed with a central socket 13 axially rearward extending from front end thereof. One side of the tool connecting section 12 is formed with a front and a rear radial through holes 14 communicating with the socket 13. The opening of each end of each through hole 14 is formed with a fish-eye hole 141 with larger inner diameter. A locating pin 15 is passed through the front through hole 14. Each end of the locating pin 15 is formed with a head section 151 with larger outer diameter corresponding to the fish-eye hole 141. An engaging pin 16 is passed through the rear through hole 14. The engaging pin 16 has a length larger than that of the locating pin 15. Each end of the engaging pin 16 is also formed with a head section 161 with larger outer diameter for fitting into the fish-eye hole 141. The engaging pin 16 has a large diameter section 162 and a small diameter section 163. A spring 17 is fitted around the small diameter section 163. Two ends of the spring 17 respectively abut against the bottom of the fish-eye hole 141 and the head section 161 of the engaging pin 16.

One end of each of the tools 4 is formed with a working section 41 with different functions. The other end of the tool 4 is formed with a fitting section 42 for inserting into the socket 13 of the tool connecting section 12. The fitting section 42 is formed with a locating split 43 having an opening at one end distal from the working section 41. The locating split 43 is snugly fitted with the locating pin 15 and the small diameter section 163 of the engaging pin 16. The locating split 43 is formed with an enlarged engaging bore 44 corresponding to the engaging pin 16 for the large diameter section 162 thereof to fit in.

In use, a certain tool 4 with desired function is first selected and then the fitting section 41 of the tool 4 is inserted into the socket 13 of the tool connecting section 12. Then the head section 161 of the engaging pin 16 pushed out by the spring 17 is pressed down ( as shown in FIG. 4 ). At this time, the small diameter section 163 is positioned in the socket 13. Under such circumstance, the small diameter section 163 of the engaging pin 16 and the locating pin 15 can be both fitted into the locating split 43 of the fitting section 42. Accordingly, the fitting section 42 can be inserted into the socket without obstruction. Then the head section 161 of the engaging pin 16 is released and the spring 17 resiliently bounds to restore the engaging pin 16 to its home position. At this time, the large diameter section 162 of the engaging pin 16 returns into the socket 1 and engages into the engaging bore 44 of the fitting section 42 of the tool 4. Under such circumstance, the tool 4 is prevented from being drawn out. When it is desired to replace the tool 4, a user only needs to press down the head section 161 of the engaging pin 16, making the large diameter section 162 thereof get out of the socket 13 ( that is, the engaging bore 44 of the fitting section 42 ). Then the tool 4 can be drawn away and replaced by another tool 4. Accordingly, various kinds of tools can be associated with one single grip 1. Therefore, when carrying the tool 4, the occupied room is reduced to facilitate carriage of the tool 4.

When operating the tools 4, different forces are applied to respective tools 4 according to the functions thereof. For example, when using a knife to cut a work piece, the front end of the tool 4 ( the blade of the knife ) is the point of application force, while the engaging bore 44 of the tool 4 is the fulcrum ( as shown in FIG. 3) and the position where the locating pin 15 abuts against the locating split 43 is the point of resistant force. Accordingly, the locating pin 15 serves to prevent the fitting section 42 from colliding the inner wall of the socket 13 and damaging when applying the force to the tool.

Figure 6:
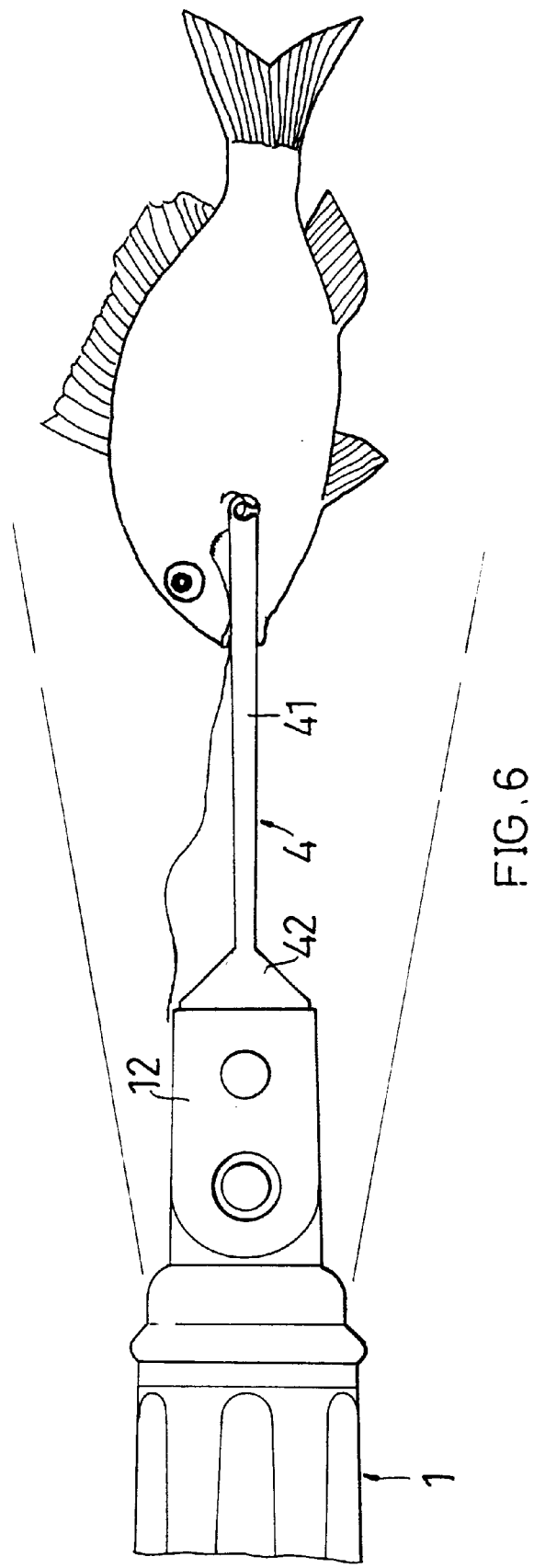
FIG. 6 shows the application of the present invention.

FIG. 6 shows that the present invention is used in a dark place. A tool 4 for extracting a fishing hook is fitted with the tool connecting section 12 of the grip 1. When a user fishes at night, the user often fails to clearly see the signal presented by the float when the fish bites the bait. Therefore, the fish often deeply eats the bait. Under such circumstance, the user can grasp the fish with one hand and hold the grip 1 in which the illuminating unit 2 is turned on with the other hand. The hook section at front end of the tool 4 is used to hook the fishing line and moved forward to the fishing hook. Then the tool 4 is pushed forward to detach the fishing hook. Thereafter, the fishing hook can be taken out. Similarly, in dark places, the illuminating unit 2 in the grip 1 enables a user to use various kinds of tools 4.

In conclusion, the present invention permits different kinds of tools to be connected with one single grip 1 and the illuminating unit 2 in the grip 1 provides illumination in dark places so that a user no more needs to operate the tool with single hand. Moreover, by means of the locating pin 15, the fitting section 42 of the tool 4 will not collide the inner wall of the tool connecting section 12 when applying a force onto the tool so that the using life of the tool can be prolonged.

The above embodiment is only used to illustrate the present invention, not intended to limit the scope thereof. Many modifications of the above embodiment can be made without departing from the spirit of the present invention.

What is claimed is:

1. A field multi-use tool structure comprising:

a grip, at least front end of the grip being made of transparent material, an illuminating unit being disposed in the grip, the illuminating unit including a light emitting member, a set of cells and a switch disposed on rear end face of the grip, a front end of the grip having a tool connecting section formed with a central socket axially rearward extending from front end thereof, one side of the tool connecting section being formed with a front and a rear radial through-holes communicating with the socket, the opening of each end of each through hole being formed with a fish-eye hole with larger inner diameter, a locating pin being passed through the front through hole, each end of the locating pin being formed with a head section with larger outer diameter corresponding to the fish-eye hole, an engaging pin being passed through the rear through hole, the engaging pin having a length larger than that of the locating pin, each end of the engaging pin being formed with a head section with larger outer diameter for fitting into the fish-eye hole, the engaging pin having a large diameter section and a small diameter section, a spring being fitted around the small diameter section, two ends of the spring respectively abutting against the bottom of the fish-eye hole and the head section of the engaging pin; and multiple tools, one end of each of the tools being formed with a working section with different functions, the other end of the tool being formed with a fitting section for inserting into the socket of the tool connecting section, the fitting section being formed with a locating split having an opening at one end distal from the working section, the locating split being snugly fitted with the locating pin and the small diameter section of the engaging pin, the locating split being formed with an enlarged engaging bore corresponding to the engaging pin for the large diameter section thereof to fit in.

2. A field multi-use tool structure as claimed in claim 1, wherein a connecting section is disposed on one side of the rear end of the grip for pivotally connecting with a rear cap, a compass being disposed in the rear cap, a hook section being formed on one side of the rear cap opposite to a pivot section thereof, the grip being formed with a dent corresponding to the hook section of the rear cap for latching with the hook section when closing the rear cap.

* * * * *